(12) United States Patent
Stump, II (10) Patent No.: US 11,597,329 B2
(45) Date of Patent: Mar. 7, 2023

(54) STORAGE SYSTEM FOR DETACHABLE JEEP-TYPE DOORS

(71) Applicant: John W. Stump, II, North Fort Myers, FL (US)

(72) Inventor: John W. Stump, II, North Fort Myers, FL (US)

(*) Notice: Subject to any disclaimer, the term of this patent is extended or adjusted under 35 U.S.C. 154(b) by 234 days.

(21) Appl. No.: 16/808,125

(22) Filed: Mar. 3, 2020

(65) Prior Publication Data
US 2020/0290521 A1    Sep. 17, 2020

Related U.S. Application Data

(60) Provisional application No. 62/816,754, filed on Mar. 11, 2019.

(51) Int. Cl.
*B60R 9/06* (2006.01)
*B62B 3/10* (2006.01)

(52) U.S. Cl.
CPC ............... *B60R 9/06* (2013.01); *B62B 3/108* (2013.01)

(58) Field of Classification Search
CPC .................................. B60R 9/06; B62B 3/108
USPC ........................................................ 224/519
See application file for complete search history.

(56) References Cited

U.S. PATENT DOCUMENTS

| | | | | |
|---|---|---|---|---|
| 5,497,927 A * | 3/1996 | Peterson | ................... | B60R 9/06 224/523 |
| 6,070,926 A * | 6/2000 | Hardin | ...................... | B60P 3/40 224/521 |
| 6,811,038 B1 * | 11/2004 | Sanderson | ............. | A47B 81/00 211/13.1 |
| 7,275,670 B1 * | 10/2007 | Shumack | .................. | B60R 9/06 224/518 |
| 7,293,681 B2 * | 11/2007 | Wills | ........................ | B60R 9/06 224/495 |
| 9,398,719 B2 * | 7/2016 | Westby | ............. | F16M 11/2092 |
| 9,623,807 B2 * | 4/2017 | Singleton | ............... | B62D 43/02 |
| 10,150,420 B2 * | 12/2018 | Stojkovic | ................. | B60J 5/047 |
| 10,674,818 B2 * | 6/2020 | Mars | ..................... | A47F 7/0021 |
| 10,981,588 B1 * | 4/2021 | Poudrier | .................. | B62B 3/02 |
| 2005/0258200 A1 * | 11/2005 | Scola | ........................ | B60R 9/06 224/42.13 |
| 2006/0011684 A1 * | 1/2006 | Wills | ........................ | B60R 9/06 224/512 |
| 2006/0065688 A1 * | 3/2006 | Hasz | ........................ | B60R 9/06 224/521 |
| 2007/0181624 A1 * | 8/2007 | Smith | ....................... | B60R 9/00 224/533 |
| 2015/0283951 A1 * | 10/2015 | Singleton | ................. | B60J 7/106 224/519 |
| 2016/0362064 A1 * | 12/2016 | Singleton | ................. | B60J 7/106 |

(Continued)

*Primary Examiner* — Nathan J Newhouse
*Assistant Examiner* — Lester L Vanterpool (57) ABSTRACT

To my surprise Jeep-type door storage is not as versatile and accommodating as you would think. For as long as there have been Jeep-type vehicles with detachable doors, you'd think every storage problem would be solved, but it has not been-until now. The nature of my invention is to provide multiple ways of door storage for detachable Jeep-type doors through one storage system. It is made as simple as possible with all components concentrated to accommodate every thinkable way of storing detachable Jeep-type doors, using one single storage frame per door, that can accommodate multiple storage needs.

6 Claims, 7 Drawing Sheets

(56) References Cited

U.S. PATENT DOCUMENTS

2018/0045365 A1\* 2/2018 Higgins ................. F16M 13/02
2019/0331291 A1\* 10/2019 Poudrier ................ F16M 11/22

\* cited by examiner

Top view of hitch mount system

STORAGE SYSTEM FOR DETACHABLE JEEP-TYPE DOORS

BACKGROUND OF THE INVENTION

Since I've owned my Jeep while driving with the doors off, I have stored them by leaning them against a wall or by laying them down flat on the floor. One year when I was laid off from work, I decided to whip together a couple of door storage frames in the form of a cart. I found that it wasn't that easy. The reason is because I decided to utilize the door hinges and latching mechanism already provided on the Jeep door. I built the first frame in the back yard because I didn't have a shop at that time. Being an Iron Worker by trade I know something about fabricating steel. I purchased a little 110 wire welder. With a lot of trial and error I finally got everything to line up and latch. I ended up making two separate frames. One driver's side and one passenger side. After that I realized I could mount these frames just about anywhere utilizing connection points established. I made a hitch mount that could attach to the tow package of my Jeep that both frames could be seated and fastened to. By this time, I had found some shop equipment and built a fab table along with buying a drill press and a small band saw. I turned my very small garage into a fab shop and started thinking along the lines of a patent. My wife and I started checking to see if this project was patentable. All work was kept to ourselves completely covert. We contacted the USPTO and they sent us the package with books on how to file a patent and we began our paperwork at home. While I worked on my project my wife kept in contact with the Inventor's Assistance Center and they explained how to research the patent website for similar patents such as the one like my invention. When we realized there is no Jeep-type door storage unit like mine in the United States, I filed for a provisional patent through the USPTO website online. Once I received the Provisional Application No. 62/816,754 back from the USPTO I retained a local patent agent we found from the USPTO website to file the non-provisional patent for us. That agent researched and advised us that my Jeep-type door storage system invention was novel both in the USA and Internationally. He then advised us to go ahead with marketing and/or manufacturing my invention. We used the hitch mount and door carrier often as I custom made it for my Jeep. I then made some modifications more accommodating to other removable Jeep-type doors. I made the bottom hinge adjustable and I made the latching mount adjustable. This will accommodate different hinge and latch dimensions. I had designed multiple attachments for these frames creating a total storage system for removable Jeep-type doors. Regretfully, the patent agent contacted me via email in October 2019 stating he was, going into full retirement and wished me well with my invention. That left my wife and I in a bind scrambling to figure out how to file the non-provisional patent ourselves and in a timely manner. Since we already knew that there are similar door storage patents out there but they only store in one specific way not multiple ways of storage with one set of frames like my invention does we were confident to proceed on our own. I already had gone back to work out of state with the goal of saving money for the cost of the professional prototype and for paying our patent agent final filing fees unknowing that he was about to retire. For the last year all our efforts have revolved around making necessary adjustments improving my invention and focusing on details to describe in words on paper for the non-provisional patent for my invention of a storage system for Jeep-type doors.

BRIEF SUMMARY OF THE INVENTION

In the beginning thoughts of my invention, the intended goal was to build for myself a Jeep door storage frame that I could store in my garage and attach on the back of my Jeep utilizing the hinge and latch provided on my Jeep doors to mount and secure for storage. The storage unit was going to be a set of frames with wheels. While in the process of building it, I realized that the passenger and driver's side door storage frames don't necessarily have to be attached together. By using the connector points that established in the process, each frame could be mounted individually and stored in multiple ways. After I started this project, I began looking for other Jeeps with door storage racks. I didn't see any. Then I looked up Jeep door storage online to see if they even sell them. What I found out was that they all only store Jeep-type doors in one of these ways: a vehicle transport, as a cart or hang/mount on a wall. Not all three ways in one. Because of this inconvenience, that is more than likely why I haven't seen Jeep door storage racks on Jeep vehicles. For example, if out of town you would want a door storage system to detach from your vehicle and use as a mobile door transport. Also, whether travelling or not you want a door storage system that can be used in multiple ways that causes less clutter. There are many things I have bought that I don't use. If you own a Jeep and like riding with your doors off, you will always have use for these frames. The outcome is I have developed a door storage system that solves the problem of inconvenient door storage issues for removable Jeep-type doors.

DETAILED DESCRIPTION OF THE INVENTION

Figure 1:
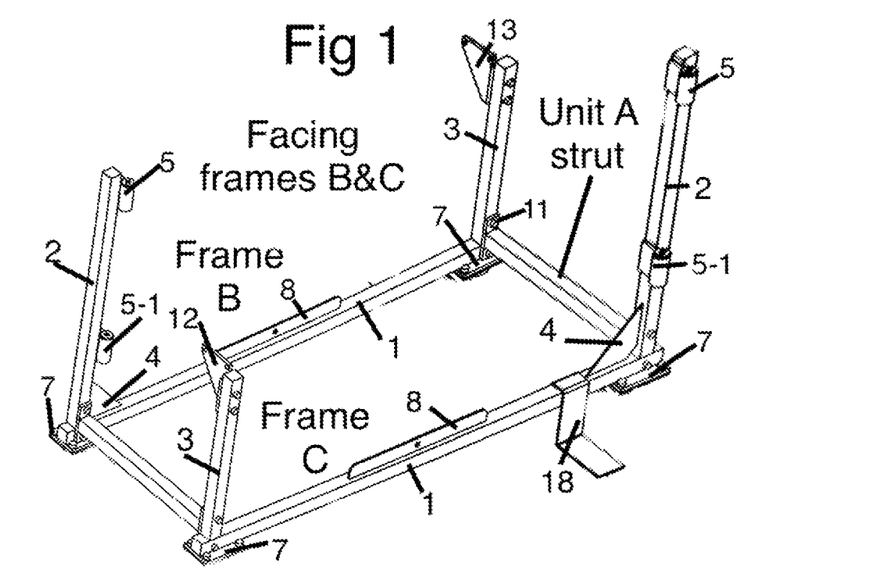
FIG. 1: Frame B and Frame C while attached to Unit A Strut
Figure 2:
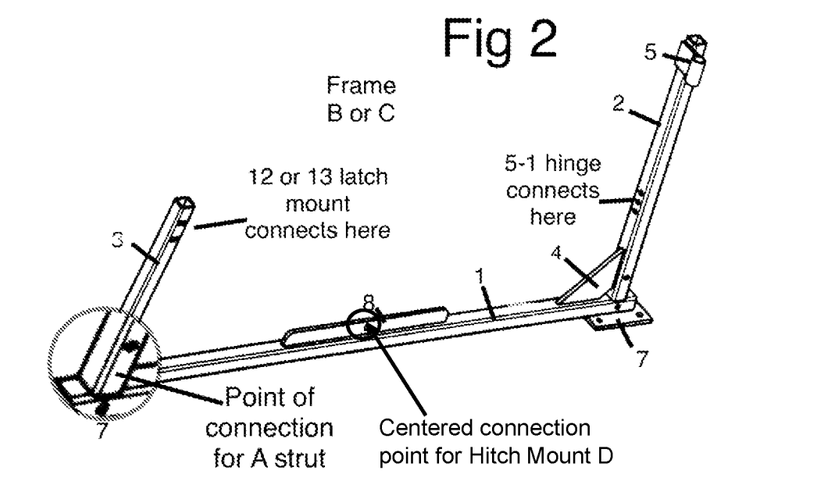
FIG. 2: Frame B or C model showing Part #5 and connection points
Figure 5:
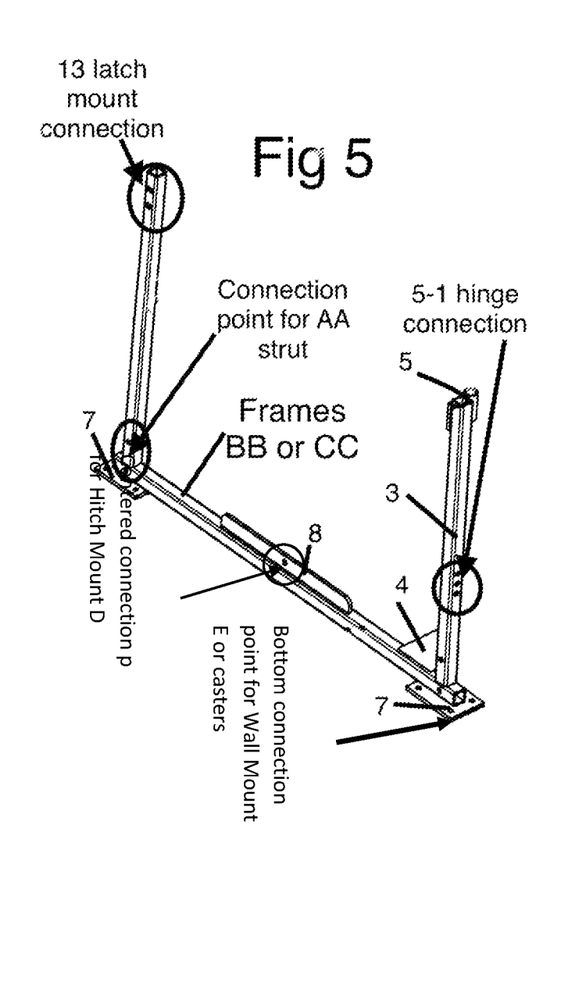
FIG. 5: One single Frame, BB or CC, with detailed part numbers with connection points

This is a door storage system for detachable Jeep-type doors. Herein mentioned capital letters correspond as follows: All A's are struts, all B's are driver's side door storage frames, all C's are passenger side door storage frames, all D's are hitch mount frames and E is a wall mount. Frame B is the driver's side door storage frame. Frame C is the passenger's side door storage frame. As facing Frame B the vertical hinge post (Part #2) will be attached on the left top end of horizontal (Part #1) and as facing Frame C the vertical hinge post (Part #2) will be attached on the right top end of horizontal (Part #1). At the inside corner of all hinge posts Part #2 attached to Part #1 is Part #4 Knee brace. Frame B latch post (Part #3) will be attached on the top right end of horizontal (Part #1). Frame C latch post (Part #3) will be attached at the left top end of horizontal (Part #1). When facing assembled Frames B or C they are a squared U-shape with outside dimensions of preferably 39 inches vertical post Part #2 to vertical post Part #3 (refer to FIGS. 1 & 2). Jeep-type doors can be mounted on these Frames by utilizing the hinge pins that are provided on the detachable Jeep-type door. Frames B & C are equipped with two female hinge apparatuses on each frame properly spaced to receive the door hinge pins of the detachable Jeep-type doors. Frame B has two hinge pin receivers and Frame C has two hinge pin receivers to receive the door hinge pins of the detachable Jeep-type doors. Hinge Receiver (Part #5-1) will adjust vertically up and down preferably no more than an inch and a half (1½") of adjustment. The detachable Jeep-type doors can be secured from swinging out by utilizing the latching mechanism provided on the Jeep-type door. Frames B & C each come equipped with one latch mount attached on B & C Frames. Latch mounts (Parts #12 & 13) both are adjustable horizontally, vertically and diagonally lining up with the latching apparatus of the detachable Jeep-type door (refer to FIG. 1). For Frames B & C to stand vertical upright they can be fastened or anchored by utilizing the connector apparatus (Part #7) attached to the underneath side of each end of each Frame B & C (refer to FIGS. 1, 2 & 5). This allows for B & C Frames to be fastened or anchored to a sturdy flat surface (refer to FIG. 1). These Part #7 connectors are also used on other attachments and supports, for example, the Wall Mount.

Figure 6:
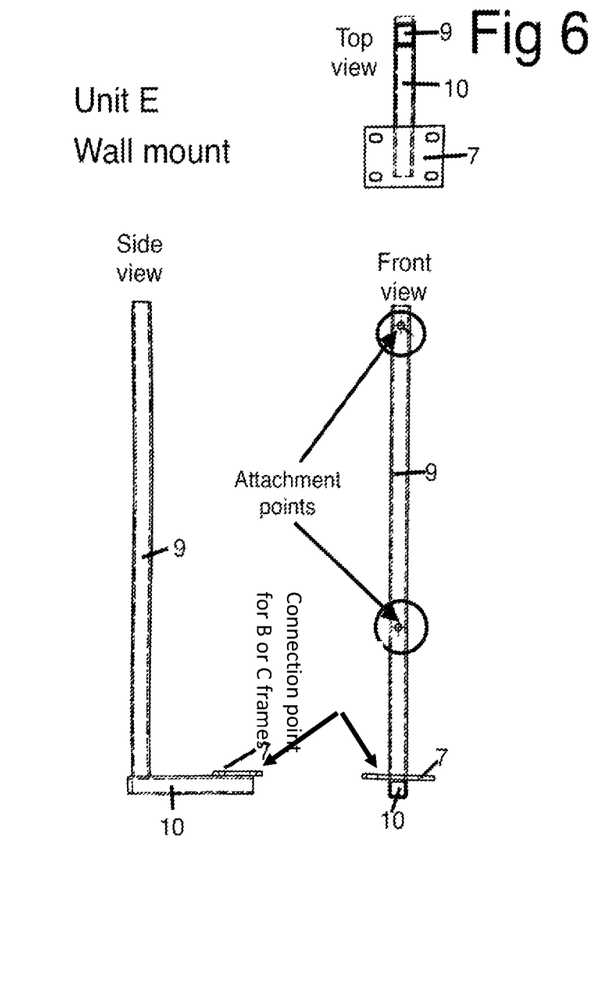
FIG. 6: Detailed top, side and front views of Unit E Wall Mount with connection locations
Figure 7:
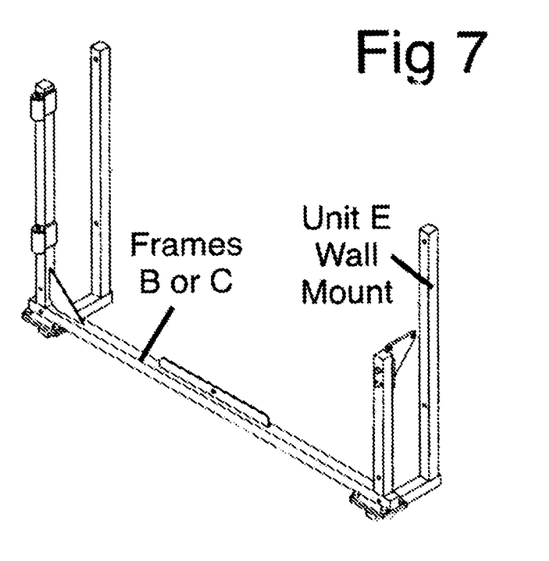
FIG. 7: Two Unit E Wall Mounts supporting one B or C Frame
Figure 14:
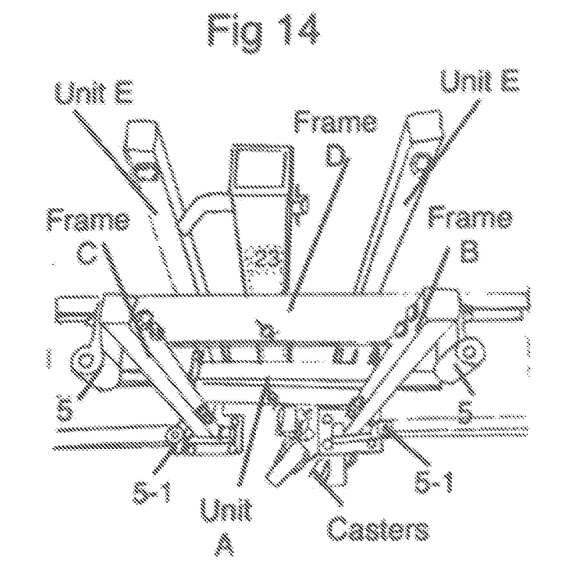
FIG. 14: Suitable for front page view of publication as the illustration of the invention depicting a picture of B and C Frames mounted on Unit E Wall Mounts along with other detachable components

Wall Mount—Attaching two L-shaped wall mounts (Unit E) to a vertical structure with adequate spacing can support one Frame each B & C. Unit E has attachment locations provided on Part #9 of Unit E to attach to a wall like structure. Unit E has a connector Part #7 attached to Part #10 horizontal support attached to Part #9 vertical mount. Parts #9, #10 and #7 make up Unit E (refer to FIGS. 6, 7 & 14).

Struts—Part #11 is a preferred standard connector attached at each end of all struts (Unit A). B & C Frames have a standard side connection point on each end of each frame on the lower portion of Frames B & C. Unit A Strut can fasten to these side connection points attaching the two frames together using one or two Unit A Struts securing and stabilizing B & C Frames in the vertical upright position (refer to FIGS. 1, 2 & 5).

Figure 3:
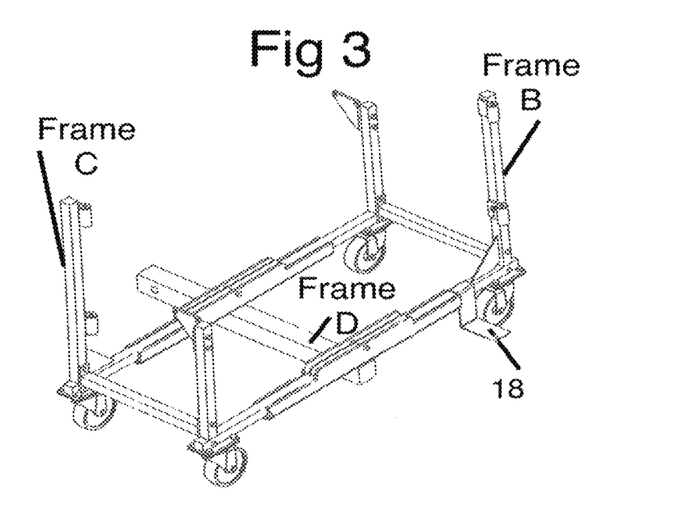
FIG. 3: Driver's side and passenger side storage Frames B and C, assembled with castors and Unit A Struts, attached to Hitch Mount Frame D with Foot Lever Part #18
Figure 4:
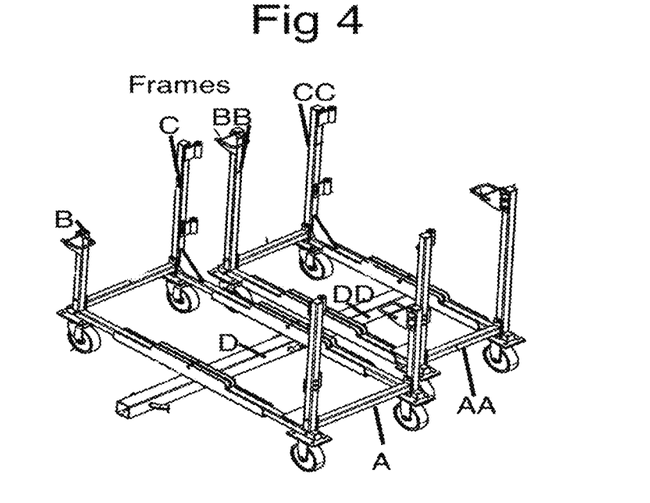
FIG. 4: Multiple door storage frames attached to both Hitch Mount D and DO spliced together with all Unit A Struts in place
Figure 8:
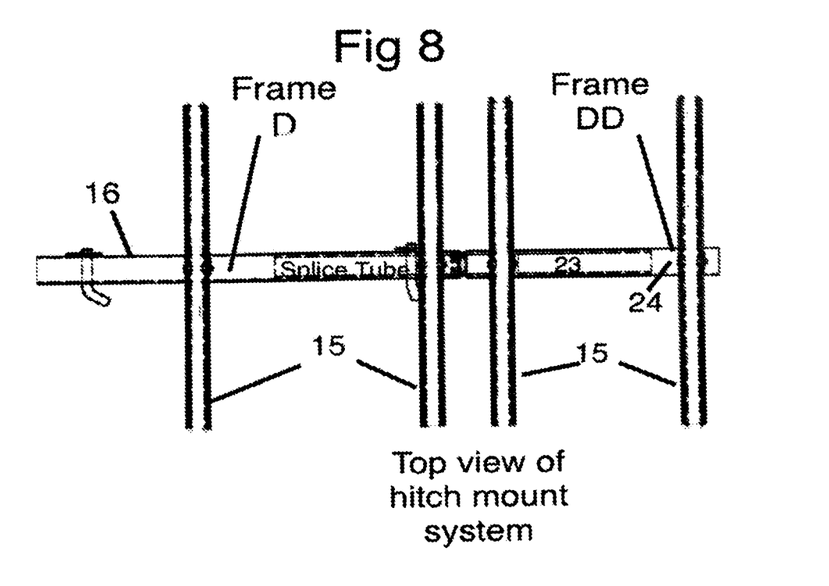
FIG. 8: Both Hitch Mount Frames D and DD spliced together with Splice Tube Part #23 with detailed part numbers
Figure 9:
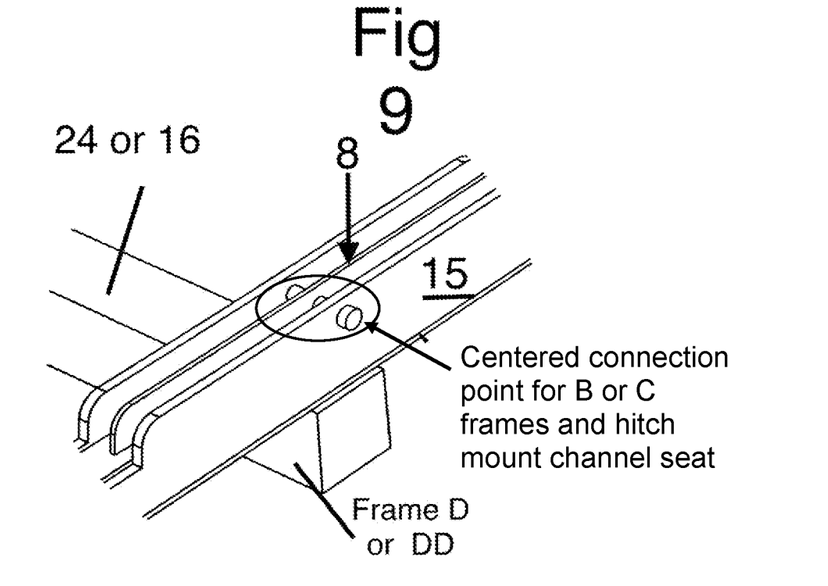
FIG. 9: B or C Frame seated and fastened to either Hitch Mount Frame D or DD
Figure 10:
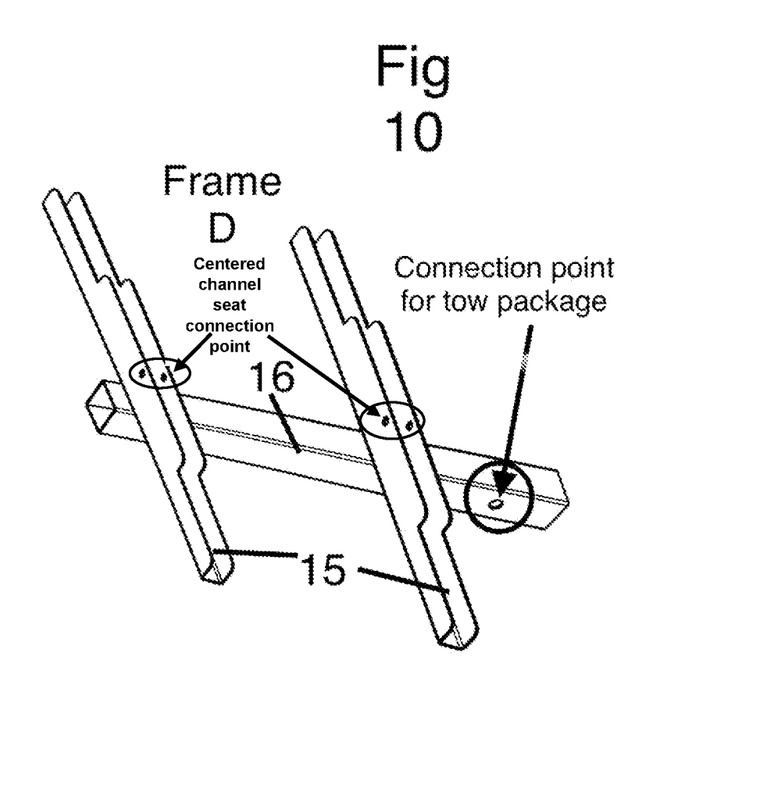
FIG. 10: Hitch Mount Frame D with numbered parts and connection
Figure 11:
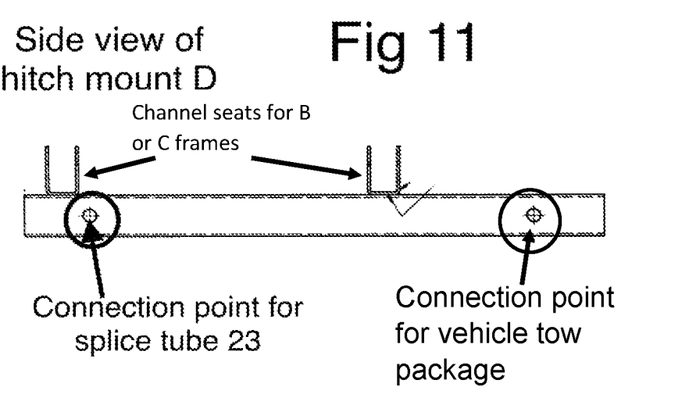
FIG. 11: Side view of Hitch Mount Frame D showing connection point for Splice Tube Part #23
Figure 12:
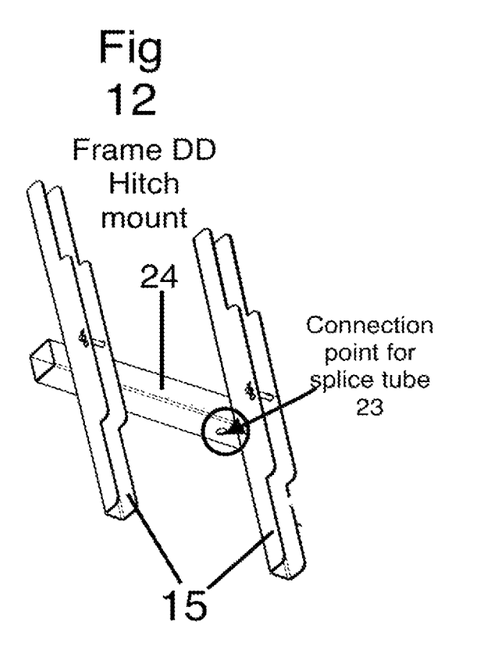
FIG. 12: Frame DD Hitch Mount numbered parts with connection point for Splice Tube Part #23
Figure 13:
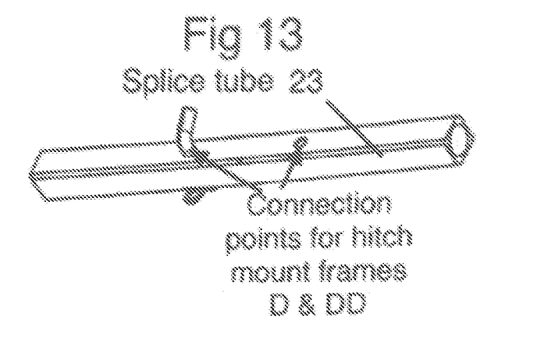
FIG. 13: Splice Tube Part #23 and connection points

Hitch Mount—B & C Frames can also be attached to a hitch mount which is Frame D. Preferably centered on Frames B & C is a fastener/stiffener Part #8 attached to the horizontal member Part #1 of Frames B & C, This will allow Frames B & C to fasten to Hitch Mount Frame D. Hitch Mount Frame D has two frame seats Part #15 attached to Part #16 that receive Frames B & C to insert and fasten to Frame D. Part #15 is equipped with a fastener point aligned with Part #8 on Frame B & C to preferably be pinned together and secured for transport (refer to FIG. 9). Two Unit A Struts are preferred to be attached to B & C Frames securing the two frames together while using them with Hitch Mount Frame D. Frame D can be inserted into a Reese-type hitch tow package. Frame D also has a connection point toward the rear. This connection point is used to fasten Splice Tube Part #23 (refer to FIGS. 11 & 13). This splice tube is designed for the purpose of adding a second Hitch Mount Frame DD. Splice tube Part #23 inserts into both Frame D & DD Hitch. Mounts (refer to FIG. 8). Both hitch mounts can be fastened to splice tube Part #23. Frames BB & CC can be inserted to Frame DD. Part #15 attached to Part #24 of Frame DD can allow multiple door frames to be connected together to Hitch Mount Frames D & DD connected by splice tube #23 (refer to FIGS. 4, 8, 11 & 12). BB & CC Frames are for added door storage for Jeep-type detachable doors. Frame BB is for the narrower driver's side door and Frame CC is for the narrower passenger's side door. BB & CC door Frames are preferably of the same components as B & C Frames (see FIGS. 2 & 5). BB & CC and B & C Frames are not wider than the rear taillights of an average Jeep-type vehicle. All B's & C's Frame's widths are preferably no greater than 39 inches. B & C and BB & CC Frames have multiple connector Part #7 to receive castors making said frames mobile if preferred. It is best to have all A and AA Struts in place on B & C Frames and BB & CC Frames making said frames stable. Castors may or may not be removed while attached on hitch mount connected to vehicle tow package. With castors attached to Frames B, C, BB & CC while still attached to Hitch Mount Frames D & DO and disconnected from the tow package of vehicle, all six frames can be one mobile unit. Disconnecting Splice Tube Part #23 from Hitch Mount DO can make two separate mobile units (refer to FIGS. 3 & 4). Part #23 Splice Tube can be recessed and hidden inside of Frame D Hitch Mount for convenience. Both storage units, Frames B & C with Unit A Struts and Frames BB & CC with Unit AA Struts, are two mobile units while separated. To be clearer B & C Frames assembled using Unit A Struts are one unit. Frames BB & CC assembled using Unit AA Struts are one unit (refer to FIG. 3). Preferably, while as a mobile unit with castors, Hitch Mount Frame D does not have to be removed from Frames B & C. Also, preferably while as a mobile unit with castors, Hitch Mount Frame DD does not have to be removed from Frames BB & CC. From an end view, Frames B & C attached to Hitch Mount D are preferably no greater than 24 inches. Also, from an end view, Frames BB & CC while connected to DO Hitch Mount are preferably no greater than 24 inches. With that being said, the average outside house door width is 36 inches wide allowing my invention's specifications even with the hitch mounts attached to each set of Frames allows for easy access to wheeling them inside or outside of dwellings. Part #18 is a Foot Lever I designed for all door storage Frames B's & C's. The purpose of Part #18 Foot Lever is to prevent a frame from tipping while removing the doors. Place the lever preferably on horizontal Part #1 and step on it while lifting up on Jeep-type door removing door from frame (refer to FIG. 3). All A Struts can be attached to any B or C Frames on either side or both sides at the same time. Frames B and C can also be staggered using Unit A struts. It would be possible to attach 20 B and C Frames linked together with Unit A Struts.

The claimed invention is:

1. A detachable vehicle door storage system comprising:
a driver's side door storage apparatus; a passenger side door storage apparatus wherein said driver's side door storage apparatus is mirrored image of said passenger side door storage apparatus comprising a vertical hinge post, wherein further comprising a vertically adjustable lower hinge pin receiver, wherein said vertical hinge post further comprises being connectively secured to a top hinge pin receiver adequately spaced wherein said vertical hinge post connectively secured to further comprising a horizontal member having a top left end, wherein further comprising connection points through hole two (2) sides at a vertical and horizontal attachment locations, wherein said horizontal member having a bottom left end further comprising a connection point securely attached for mounting upright or removably securing a caster and other component, wherein said horizontal member having a right centered top further comprising a connection point, wherein said horizontal member also has a bottom right of center end further comprising a connection point securely attached for mounting upright or removably securing a caster and other component, wherein said horizontal member has a top right end further comprising a vertical latch post securely attached, further comprising connection points two (2) side through holes at said vertical latch post and horizontal attachment location, wherein said vertical latch post upward location further comprising
a latch mount apparatus removably secured at an adequate location wherein said latch mount apparatus is adjustable vertically, horizontally and diagonally wherein said driver's side door storage apparatus not to exceed scale of removable vehicle door apparatus vertically and horizontally wherein said horizontal member and said vertical hinge post connect wherein further comprising a knee brace at an inside corner;
a hitch mount apparatus comprising connection points and attachment locations to removably secure said driver's side door storage apparatus and said passenger side door storage apparatus;
a wall mount apparatus consisting of a tubular L shaped apparatus side view wherein connection locations to vertically mount to vertical structure and removably secure and store said driver's side door storage apparatus and said passenger side door storage apparatus, said hitch mount and other detachable components;
a strut apparatus consisting of a tubular apparatus further comprising a connection point securely attached at each end facing outwardly to removably secure said driver's side door storage apparatus and said passenger side door storage apparatus at an upright position; and
a splice tube consisting of an elongated tubular member wherein two (2) through hole side connection points adequately spaced to removably secure one (1) said hitch mount for each connection point.

2. A detachable vehicle door storage system of claim 1 wherein said passenger side door storage apparatus comprising a vertical latch post wherein said vertical latch post upward location further comprising a latch mount apparatus removably secured at an adequate location wherein said latch mount apparatus is adjustable vertically, horizontally and diagonally wherein said vertical latch post is connectively secured to further comprising a horizontal member having a top left end wherein further comprising connection points through hole two (2) sides wherein vertical and horizontal attachment locations, wherein said horizontal member at bottom left end further comprising a connection point securely attached to mount upright to removably secure on said wall mount or to a caster, wherein said horizontal member having right centered top further comprising a connection point, wherein said horizontal member having bottom right of center end further comprising a connection point securely attached to mount upright to removably secure on said wall mount or to a caster, wherein said horizontal member having a top right end further comprising a vertical hinge post securely attached, further comprising connection points two (2) side through holes wherein said vertical hinge post and horizontal attachment location, vertically adjustable to a lower hinge pin receiver wherein said vertical hinge post further comprising connectively secured to a top hinge pin receiver adequately spaced wherein said passenger side door storage apparatus not to exceed scale of removable vehicle door vertically and horizontally wherein said horizontal member and said vertical hinge post connect wherein further comprising a knee brace at an inside corner.

3. A detachable vehicle door storage system as in claim 1 wherein said hitch mount comprising a lateral tubular member further comprising having a connection location point front receiver end with side through holes connectively removable to a tow hitch receiver apparatus wherein a lateral tubular member having a top location further comprising two channel seats elongated cross member connection points adequately spaced to removably secure the driver's side door storage apparatus at the centered connection point as in claim 1 and the passenger side door storage apparatus at the centered connection point as in claim 1 by ways of a through hole with removably secured pins, wherein said lateral tubular member also has a second end further comprising a side connection point through hole.

4. A detachable vehicle door storage system as in claim 1 wherein said splice apparatus consisting of a lateral tubular apparatus wherein further comprising two through hole side connection points adequately spaced wherein said splice apparatus first connection point to removably secure said hitch mount wherein said splice apparatus second connection point to removably secure second hitch mount.

5. A detachable vehicle door storage system as in claim 1 wherein said strut apparatus consisting an elongated tubular apparatus wherein further comprising two connection points one at the first end and one at the second end facing outwardly to removably secure said driver's side door storage apparatus and said passenger side door storage apparatus wherein said driver's side door storage apparatus and said passenger side door storage apparatus side connection points through holes to removably attach said strut apparatus.

6. A detachable vehicle door storage system as in claim 1 wherein said wall mount apparatus comprising an elongated vertical tubular member having a height not exceeding four feet; wherein further comprising two through hole mounting connection points adequately spaced front view wherein further comprising a horizontal tubular member at a front view connectively secured to a bottom end; wherein a vertical member to a top back end; wherein said horizontal member further comprising a connection point connectively secured to a top front end; wherein said connection point to removably attach said driver's side door storage apparatus or said passenger side door storage apparatus wherein said driver's side door storage apparatus or said passenger side door storage apparatus having a bottom end connection point to removably secure to one said wall mount connection point.

\* \* \* \* \*